United States Patent
Jayasingh et al.

(10) Patent No.: US 12,242,361 B1
(45) Date of Patent: Mar. 4, 2025

(54) SYSTEMS AND METHOD FOR RECTIFYING SERVER FAILURE OF DISTRIBUTED FILE SYSTEMS UTILIZING PREDICTIVE LOGICAL MARKERS

(71) Applicant: BANK OF AMERICA CORPORATION, Charlotte, NC (US)

(72) Inventors: Magaranth Jayasingh, Tamilnadu (IN); Vimal Chandroliya, Gujarat (IN); Preethi Jagadeesan, Tamilnadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 2 days.

(21) Appl. No.: 18/238,629

(22) Filed: Aug. 28, 2023

(51) Int. Cl.
  *G06F 11/20* (2006.01)
  *G06F 11/14* (2006.01)
(52) U.S. Cl.
  CPC ........ *G06F 11/2028* (2013.01); *G06F 11/141* (2013.01)
(58) Field of Classification Search
  CPC ................ G06F 11/2028; G06F 11/141
  See application file for complete search history.

(56) References Cited

U.S. PATENT DOCUMENTS

| | | | |
|---|---|---|---|
| 6,668,219 B2 | 12/2003 | Hwang et al. | |
| 8,280,826 B2 | 10/2012 | Putzolu et al. | |
| 10,223,636 B2 | 3/2019 | Reddy et al. | |
| 10,360,631 B1 | 7/2019 | Jezewski | |
| 10,797,718 B1 | 10/2020 | Far et al. | |
| 10,950,338 B2 | 3/2021 | Douglas | |
| 11,159,511 B1 * | 10/2021 | Geusz | H04L 63/102 |
| 11,422,735 B2 | 8/2022 | Gong et al. | |
| 11,474,986 B2 | 10/2022 | Darji et al. | |
| 11,526,405 B1 | 12/2022 | Fisher et al. | |
| 11,594,222 B2 | 2/2023 | Lefkofsky et al. | |
| 11,606,265 B2 | 3/2023 | Dechene et al. | |
| 11,676,365 B2 | 6/2023 | Kar et al. | |
| 11,775,843 B2 | 10/2023 | Roberts et al. | |
| 11,776,696 B2 | 10/2023 | Eckert et al. | |
| 11,784,764 B2 | 10/2023 | Newman et al. | |
| 2019/0179647 A1 | 6/2019 | Deka et al. | |
| 2019/0378495 A1 | 12/2019 | Kim et al. | |
| 2020/0092519 A1 | 3/2020 | Shin et al. | |
| 2020/0238531 A1 | 7/2020 | Lee et al. | |
| 2020/0380263 A1 | 12/2020 | Yang et al. | |
| 2021/0081630 A1 | 3/2021 | Pickerd | |
| 2021/0142793 A1 | 5/2021 | Chun et al. | |

(Continued)

*Primary Examiner* — Jigar P Patel
(74) *Attorney, Agent, or Firm* — Moore & Van Allen PLLC; Nicholas C. Russell

(57) ABSTRACT

This disclosure presents a system for rectifying server failures in distributed file systems using predictive logical markers. The system begins by receiving user details, a file name, and a block address via a distributed file system (DFS) client. If previous read information exists for the given file and user, a trained machine learning (ML) model predicts logical markers for file fragments. The ML model then transmits remaining block addresses to the DFS client. Concurrently, the system facilitates a data input stream, communicating predicted block addresses between the DFS client and the ML model. Block location information is retrieved from a distributed ledger via a primary node. The data input stream is processed via a secondary node, allowing efficient rectification of server failures.

20 Claims, 9 Drawing Sheets

(56) References Cited

U.S. PATENT DOCUMENTS

| | | |
|---|---|---|
| 2021/0166793 A1 | 6/2021 | Mobarakeh |
| 2021/0304868 A1 | 9/2021 | Neumann |
| 2021/0406832 A1* | 12/2021 | Tennur Narayanan ............... G06F 11/302 |
| 2022/0067621 A1 | 3/2022 | Aaltonen et al. |
| 2022/0116470 A1* | 4/2022 | Sethi ............... H04L 67/564 |
| 2022/0277323 A1 | 9/2022 | Whelan et al. |
| 2023/0093280 A1 | 3/2023 | Singh et al. |
| 2023/0115293 A1 | 4/2023 | Karr et al. |
| 2023/0229942 A1 | 7/2023 | Todd et al. |

\* cited by examiner

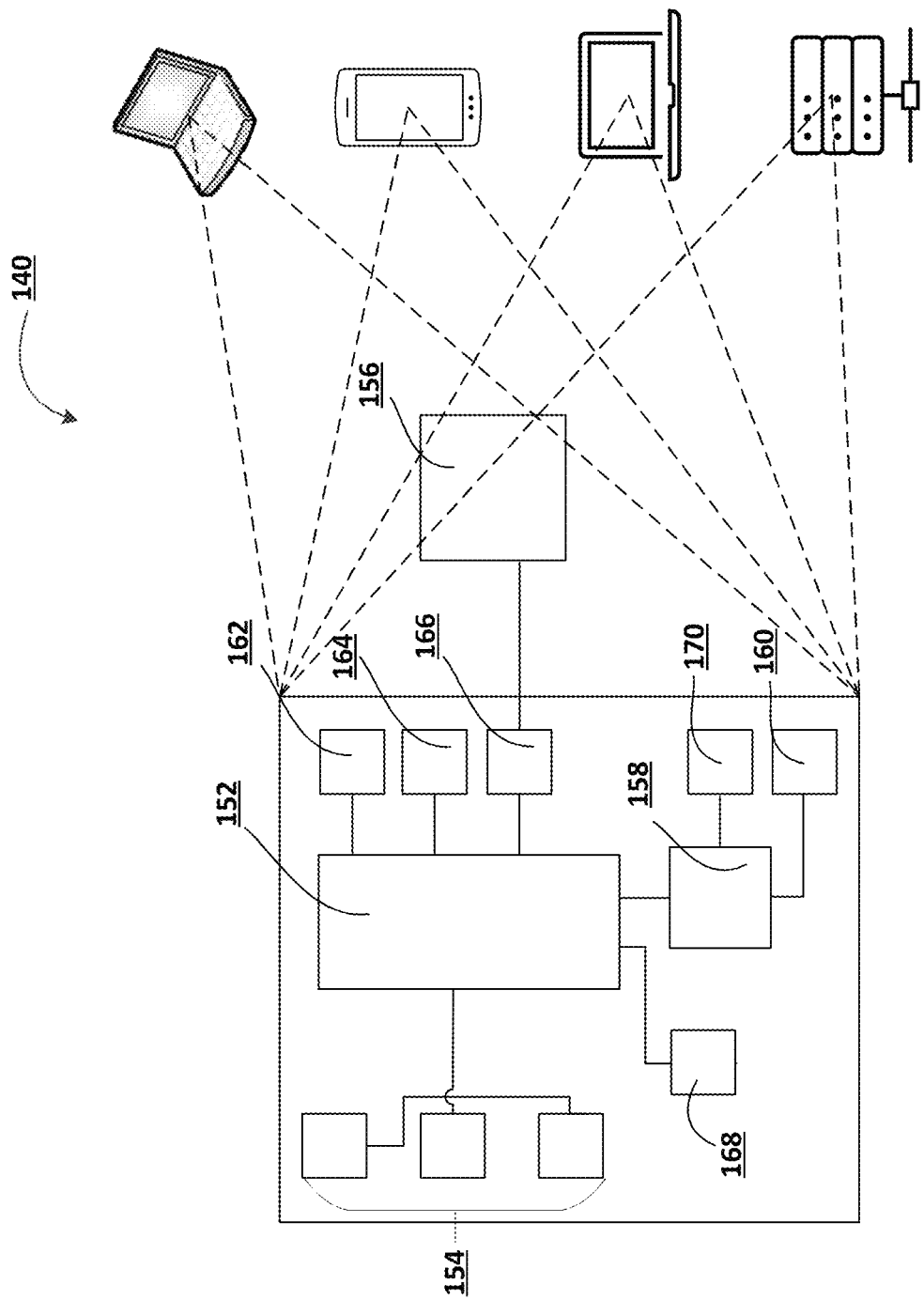

SYSTEMS AND METHOD FOR RECTIFYING SERVER FAILURE OF DISTRIBUTED FILE SYSTEMS UTILIZING PREDICTIVE LOGICAL MARKERS

TECHNOLOGICAL FIELD

Example embodiments of the present disclosure relate to systems and methods for rectifying server failure of distributed file systems utilizing predictive logical markers.

BACKGROUND

In a distributed file processing environment, files are divided and stored across multiple nodes. These files can be accessed concurrently by multiple clients for various purposes, such as updating the database, creating another file, or performing calculations. However, if the file processor's server encounters issues, such as network failures, hardware or software malfunctions, or power outages, this can lead to losing track of all blocks in process, as these files are typically spread across several nodes.

Resuming the processing of the distributed file from the exact point of interruption during a server failure presents a significant challenge. Additionally, various file processors across the network may be accessing the distributed file simultaneously, which further complicates the issue. Applicant has identified a number of deficiencies and problems associated with systems and methods for rectifying server failure of distributed file systems utilizing predictive logical markers. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for rectifying server failure of distributed file systems utilizing predictive logical markers. The proposed solution involves the integration of artificial intelligence/machine learning (AI/ML), a distributed file system (DFS), and coding languages such as C++ to develop an effective and efficient distributed file processing system.

The cornerstone of this solution is an AI engine, designed and built specifically for the task of predicting the logical marker of file fragments scattered across multiple nodes. This engine takes into account several factors, including the processing speed of each node and the file processing methods employed. By leveraging AI/ML techniques, the system can efficiently anticipate the location of data blocks, thereby mitigating the challenges posed by server failure and enabling the system to resume processing at the point of interruption.

In some embodiments, read and write requests from DFS clients are be directed through a distributed file processor, acting as a conduit for data traffic. This file processor plays a critical role in both routing the data and interacting with the AI engine. It constantly checks for previously read information corresponding to the specific file in question. If the system identifies that previously read information for the file is available, it triggers the AI engine. The engine then predicts the logical marker and broadcasts the unread block address to the DFS. This predictive ability, fueled by AI/ML, allows for more seamless access to files, significantly reducing the time and computational resources needed to locate and process data blocks.

However, if the system doesn't find any previous read information for the file, it treats the situation as a business-as-usual (BAU) scenario. In such cases, the file processor passes all the block addresses to the DFS for regular processing. This approach ensures a flexible system that caters to both standard and exceptional situations. In order to develop this solution, C++'s high performance, along with its strong capacity for managing and manipulating system resources, makes it an ideal choice in some embodiments for this complex, resource-intensive system. By combining AI/ML capabilities, a distributed file system, and the robust programming language of C++, the present system can address the challenges posed by distributed file processing in an efficient and effective manner.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
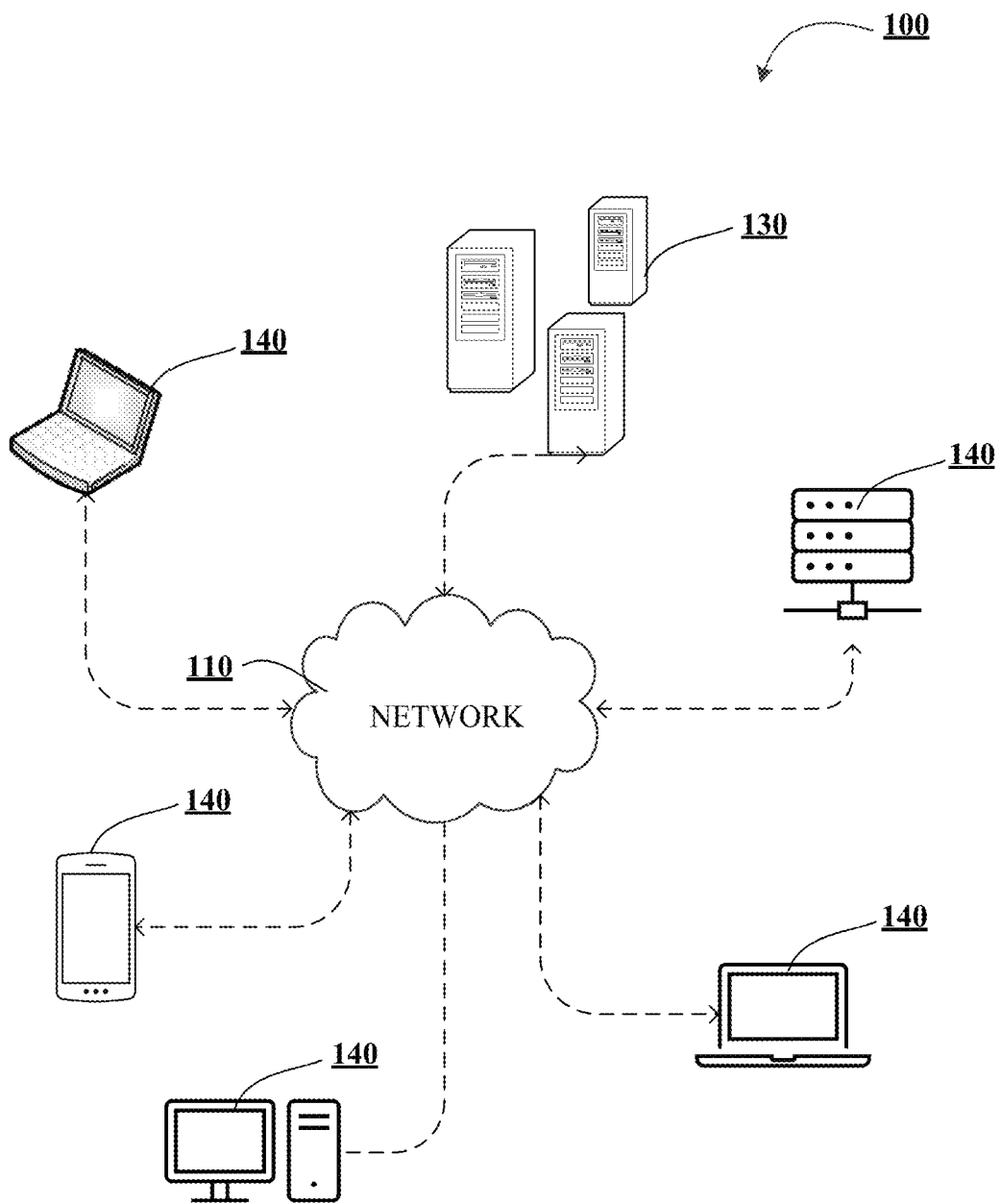
Figure 1B:
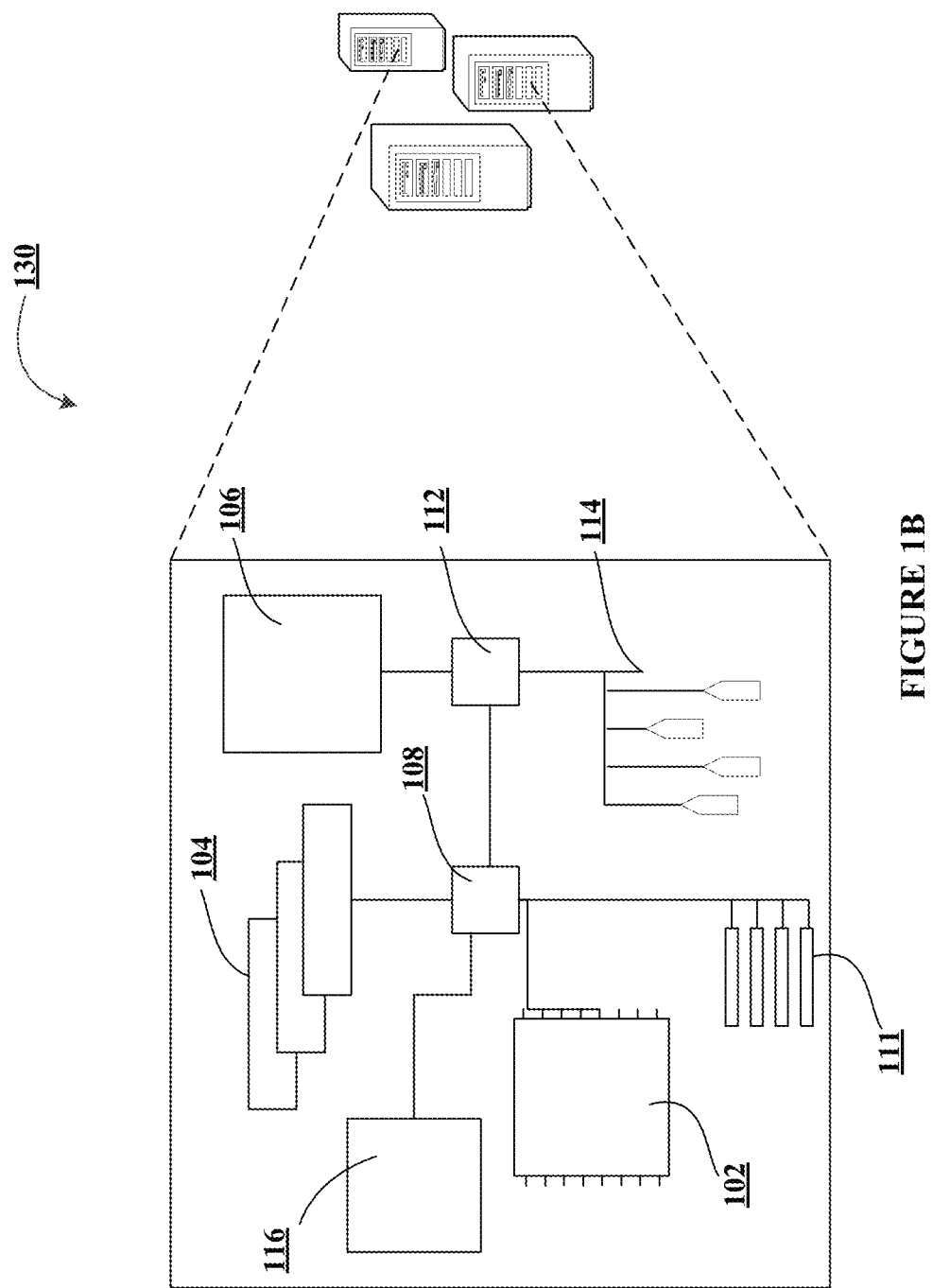
Figure 2A:
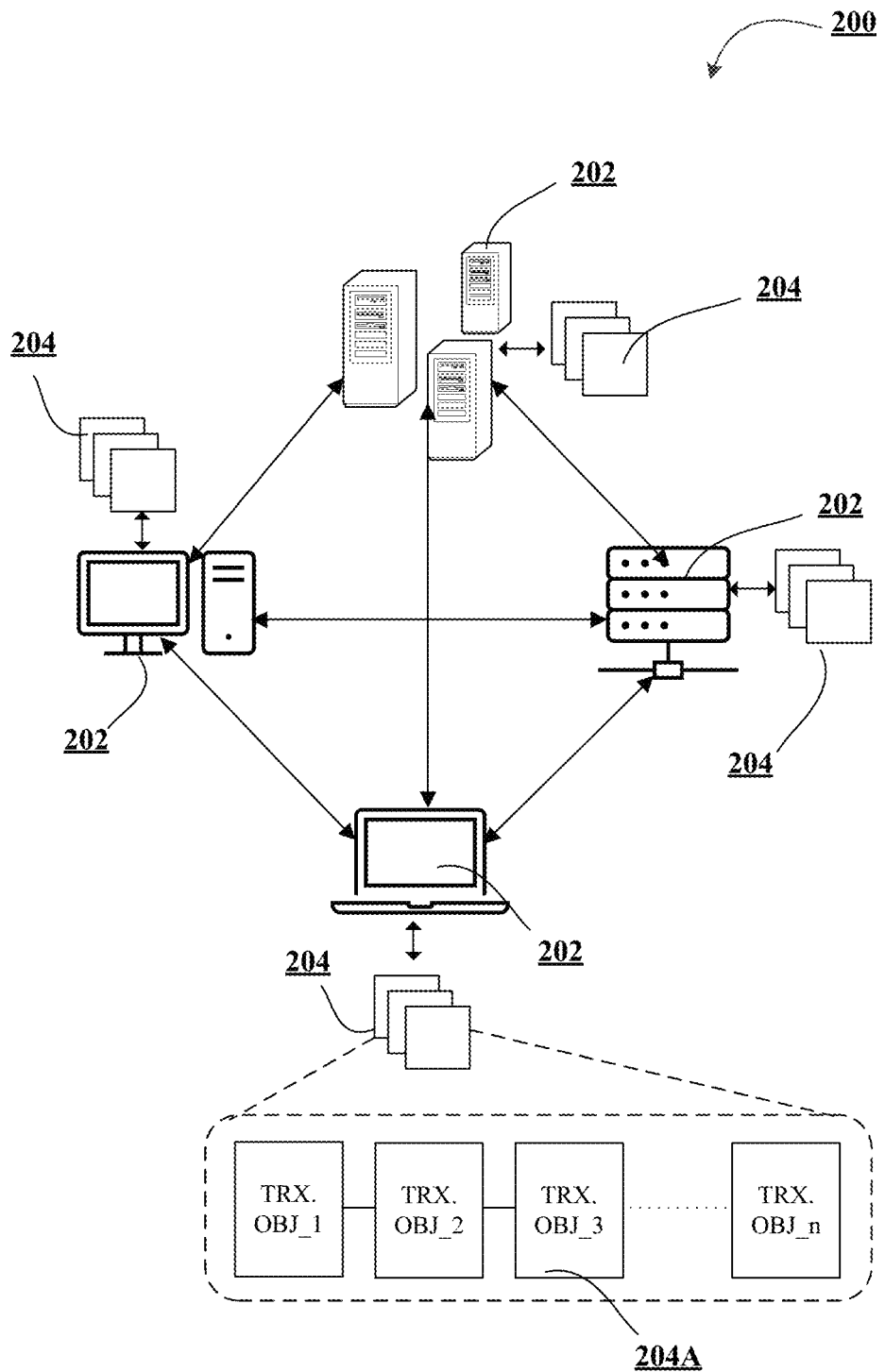
Figure 2B:
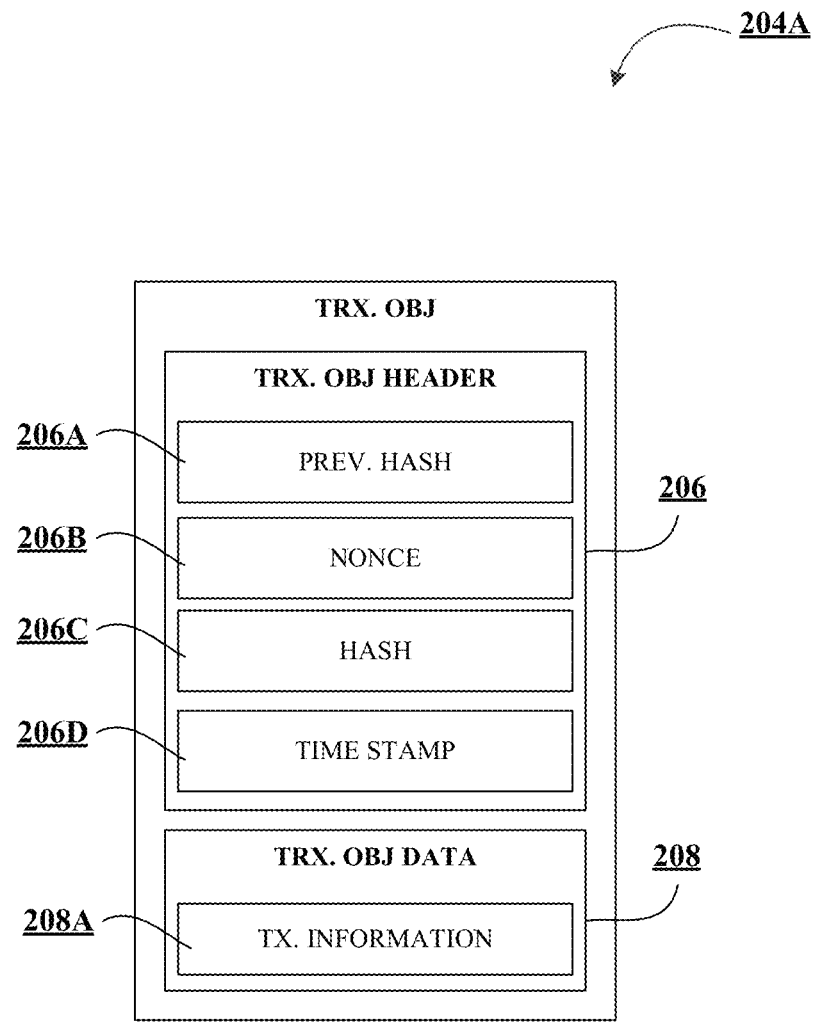
Figure 3:
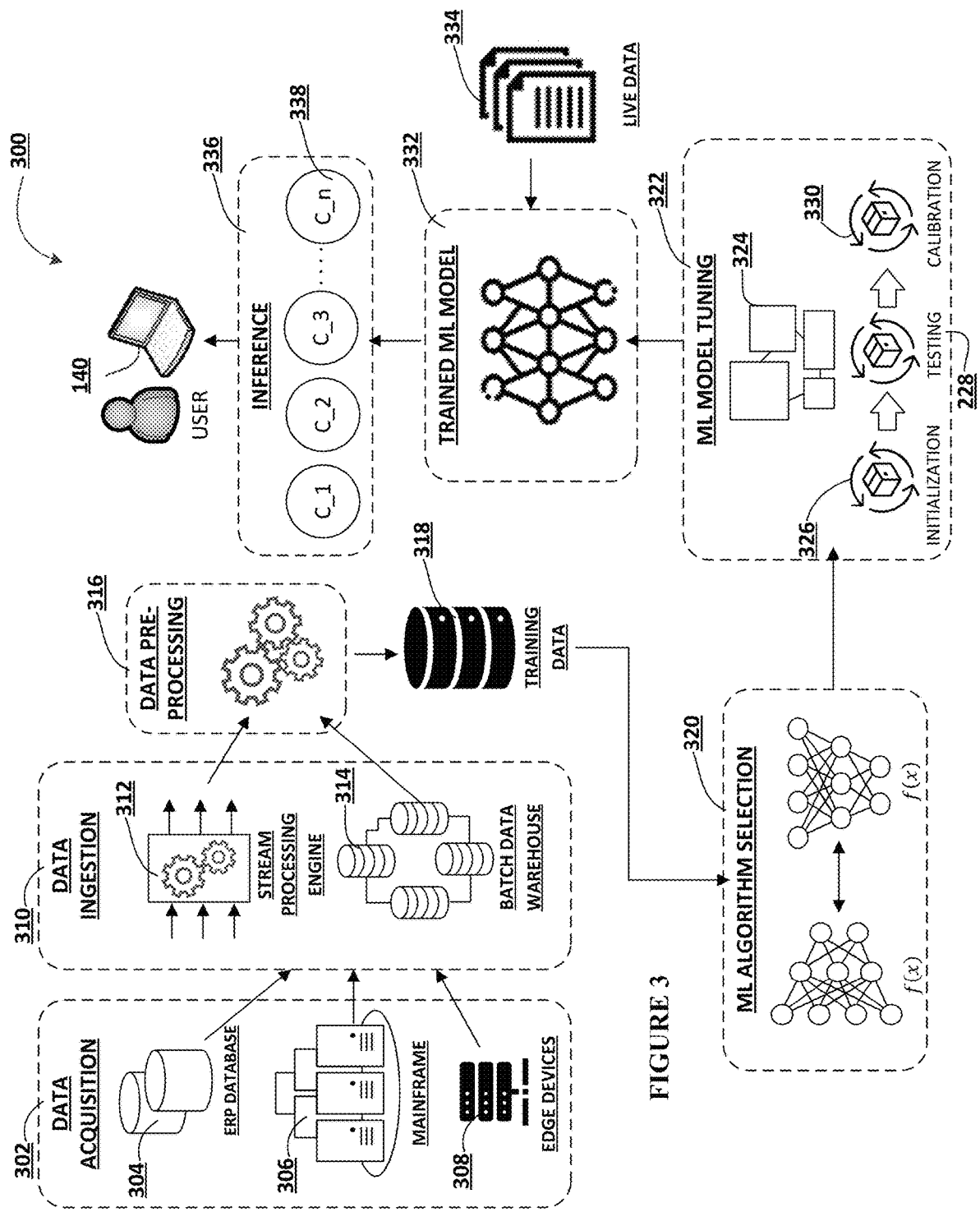
Figure 4:
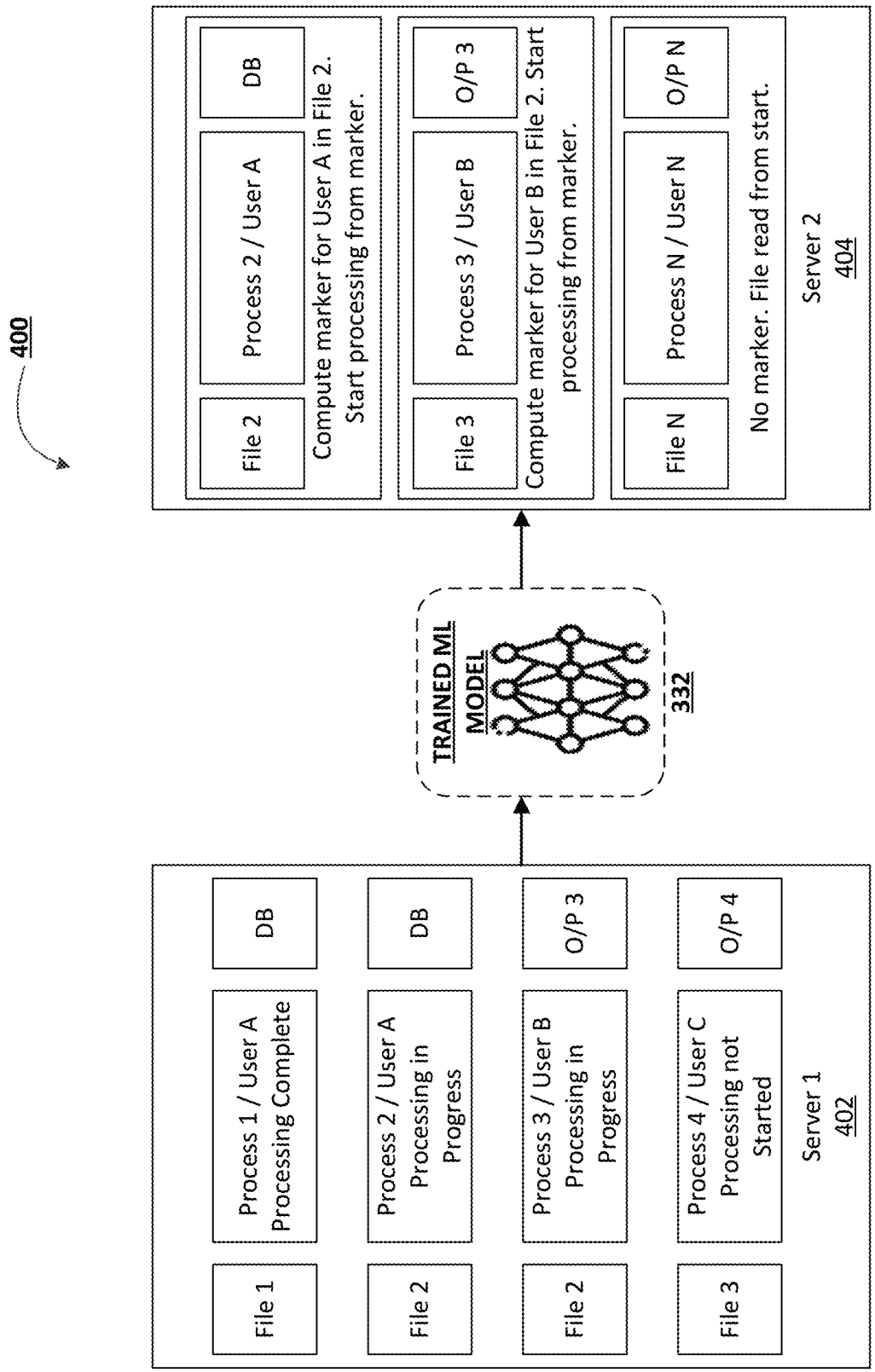
Figure 5:
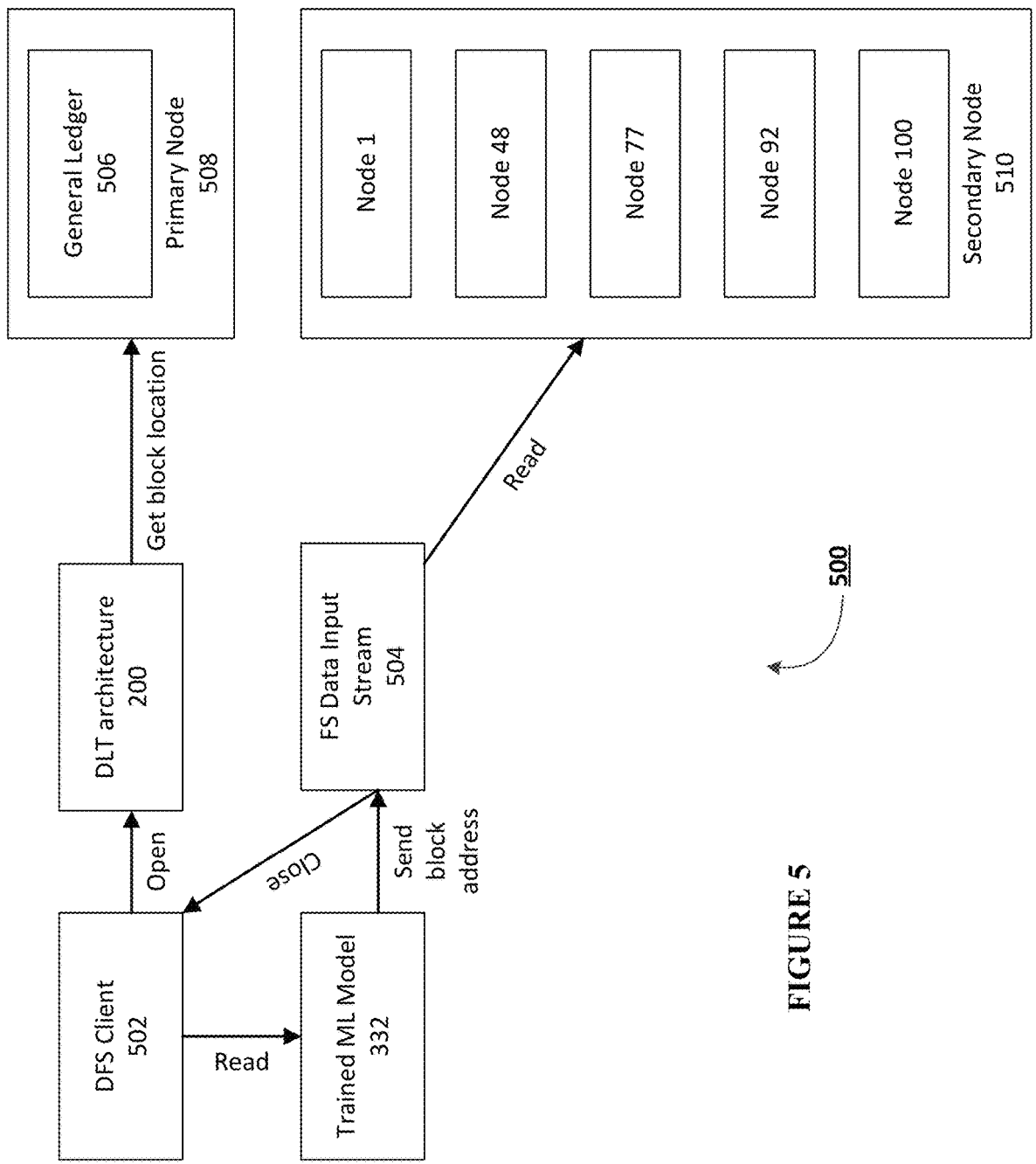
Figure 6:
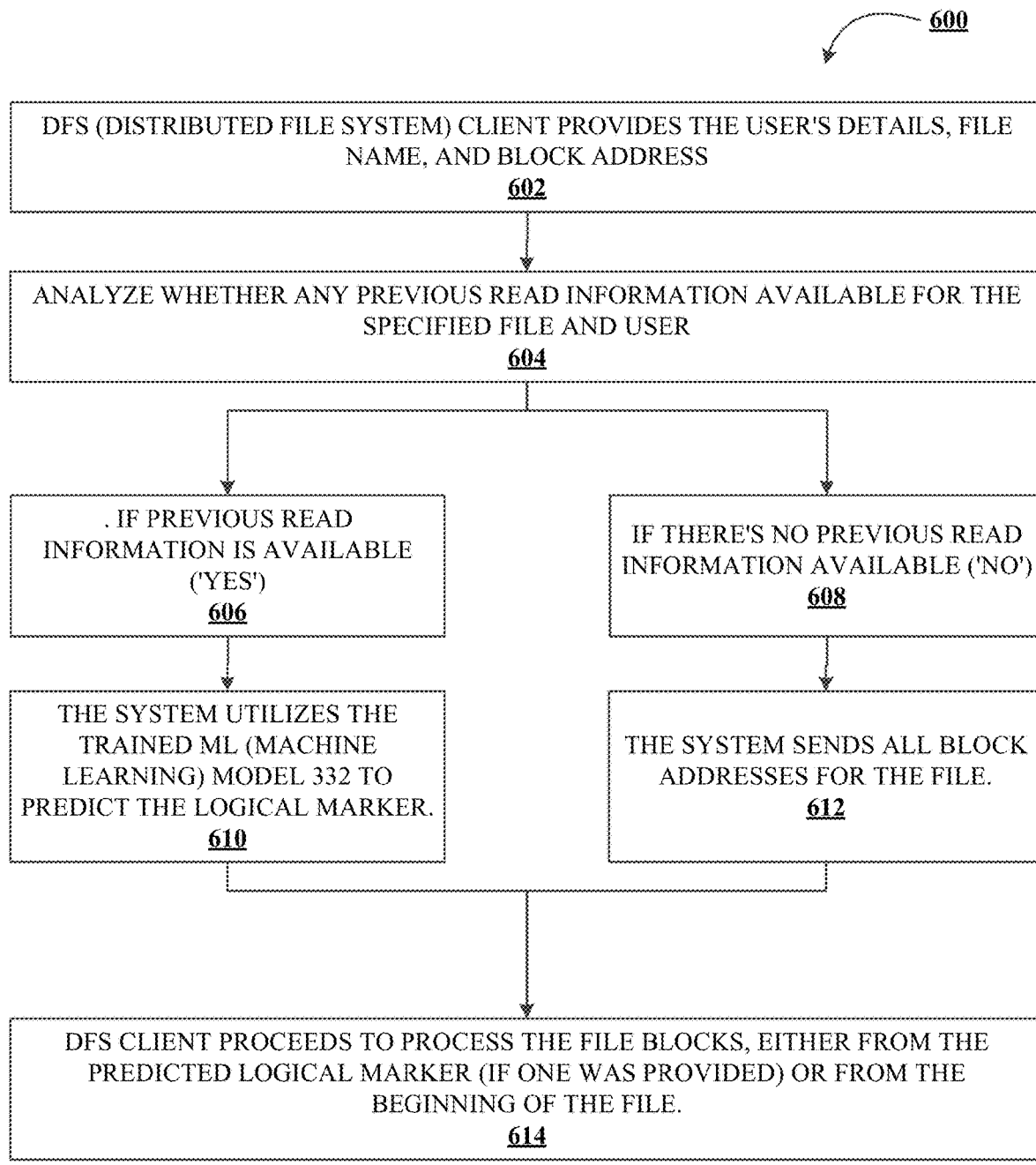

FIGS. 1A-1C illustrates technical components of an exemplary distributed computing environment for rectifying server failure of distributed file systems utilizing predictive logical markers, in accordance with an embodiment of the disclosure;

FIGS. 2A-2B illustrate an exemplary distributed ledger technology (DLT) architecture, in accordance with an embodiment of the invention;

FIG. 3 illustrates an exemplary machine learning (ML) subsystem architecture 300, in accordance with an embodiment of the invention;

FIG. 4 illustrates an exemplary failover mechanism 400 between multiple servers, in accordance with an embodiment of the invention;

FIG. 5 illustrates an intelligent process utilizing logic markers 500, in accordance with an embodiment of the invention; and FIG. 6 illustrates a process flow for rectifying server failure of distributed file systems utilizing predictive logical markers 600, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

In a distributed file processing environment, files are divided and stored across multiple nodes. These files can be accessed concurrently by multiple clients for various purposes, such as updating the database, creating another file, or performing calculations. However, if the file processor's server encounters issues, such as network failures, hardware or software malfunctions, or power outages, this can lead to losing track of all blocks in process, as these files are typically spread across several nodes.

Resuming the processing of the distributed file from the exact point of interruption during a server failure presents a significant challenge. Additionally, various file processors across the network may be accessing the distributed file simultaneously, which further complicates the issue. Applicant has identified a number of deficiencies and problems associated with systems and methods for rectifying server failure of distributed file systems utilizing predictive logical markers. Through applied effort, ingenuity, and innovation, many of these identified problems have been solved by developing solutions that are included in embodiments of the present disclosure, many examples of which are described in detail herein The proposed solution involves the integration of artificial intelligence/machine learning (AI/ML), a distributed file system (DFS), and coding languages such as C++ to develop an effective and efficient distributed file processing system.

The cornerstone of this solution is an AI engine, designed and built specifically for the task of predicting the logical marker of file fragments scattered across multiple nodes. This engine takes into account several factors, including the processing speed of each node and the file processing methods employed. By leveraging AI/ML techniques, the system can efficiently anticipate the location of data blocks, thereby mitigating the challenges posed by server failure and enabling the system to resume processing at the point of interruption.

In some embodiments, read and write requests from DFS clients are be directed through a distributed file processor, acting as a conduit for data traffic. This file processor plays a critical role in both routing the data and interacting with the AI engine. It constantly checks for previously read information corresponding to the specific file in question. If the system identifies that previously read information for the file is available, it triggers the AI engine. The engine then predicts the logical marker and broadcasts the unread block address to the DFS. This predictive ability, fueled by AI/ML, allows for more seamless access to files, significantly reducing the time and computational resources needed to locate and process data blocks.

However, if the system doesn't find any previous read information for the file, it treats the situation as a business-as-usual (BAU) scenario. In such cases, the file processor passes all the block addresses to the DFS for regular processing. This approach ensures a flexible system that caters to both standard and exceptional situations. In order to develop this solution, C++'s high performance, along with its strong capacity for managing and manipulating system resources, makes it an ideal choice in some embodiments for this complex, resource-intensive system. By combining AI/ML capabilities, a distributed file system, and the robust programming language of C++, the present system can address the challenges posed by distributed file processing in an efficient and effective manner.

In some embodiments, the uniqueness of this invention lies in its innovative use of artificial intelligence and machine learning technologies to solve complex problems inherent in distributed file processing systems. For instance, a unique aspect of the invention is the application of an AI-based engine to predict and generate logical markers for files in the distributed file system. Unlike traditional systems, the engine generates these markers based on the username, or the file processor name. This approach enables a more personalized and efficient method of file tracking and access, providing a significant advantage over conventional systems.

Another notable feature is the intelligent distributed file processor that facilitates the resumption of any client file processing from the failure point. This feature minimizes redundant processing in a distributed environment, thereby optimizing system efficiency. Such a system is a departure from conventional techniques that often involve time-consuming and resource-intensive methods to recover from processing failures.

Additionally, the system has the capacity to generate logical markers concurrently for multiple client file processors accessing a single distributed file. This capability is a significant leap forward from traditional systems, which often struggle with managing and coordinating multiple access points for a single file. This feature optimizes the handling of distributed file processing, ensuring that multiple clients can effectively and simultaneously interact with the same file without causing conflicts or inefficiencies. The ability of this system to seamlessly manage such complex operations is a testament to the power of artificial intelligence and the innovative design of this invention.

Accordingly, the present disclosure presents a solution to enhance distributed file processing through the novel integration of artificial intelligence/machine learning (AI/ML), a distributed file system (DFS), and C++. It features an AI engine, specially designed to predict the logical marker of file fragments dispersed across multiple nodes. This engine takes into consideration a variety of factors, such as each node's processing speed and the specific file processing methods used. By efficiently anticipating the location of data blocks, the AI engine mitigates the challenges posed by server failure, enabling the system to resume processing from the point of interruption. A distributed file processor handles all read and write requests from DFS clients and validates the availability of previously read information for the particular file in question.

When the system identifies previously read information for a file, it activates the AI engine to predict the logical marker and broadcast the unread block address to the DFS, significantly enhancing file access efficiency. Conversely, in cases where no previous read information is available, the system reverts to a business-as-usual (BAU) scenario, forwarding all block addresses to the DFS for regular processing. Utilizing the performance and resource management capacities of the C++ programming language, the system effectively manages these complex, resource-intensive tasks. One unique aspect of this invention lies in the AI-based engine's capability to predict and generate logical markers based on the username, providing a personalized and efficient method for file tracking and access.

What is more, the present disclosure provides a technical solution to a technical problem. As described herein, the technical problem includes the challenge of efficiently processing distributed files across multiple nodes, especially in instances of server failure or simultaneous access by multiple clients. The technical solution presented herein allows for the precise prediction of logical markers of file fragments scattered across multiple nodes, leading to effective file tracking and access, and the efficient resumption of file processing from the point of failure. In particular, the AI-based engine, developed using C++, is an improvement over existing solutions to the problem of distributed file processing. It offers (i) fewer steps to achieve the solution, thus reducing the amount of computing resources, such as processing resources, storage resources, network resources, and/or the like, that are being used, (ii) a more accurate prediction of logical markers, thus reducing the number of resources required to remedy any errors made due to a less accurate solution, (iii) the removal of manual input from the implementation of the solution, thus improving speed and efficiency of the process and conserving computing resources, (iv) the determination of an optimal amount of resources that need to be used to implement the solution, thus reducing network traffic and load on existing computing resources. Furthermore, the technical solution described herein uses a rigorous, computerized process to perform specific tasks and/or activities that were not previously performed, such as predicting logical markers based on the username and facilitating the resumption of file processing from the point of failure. In specific implementations, the technical solution bypasses a series of steps previously implemented, such as manual tracking of file fragments, thus further conserving computing resources.

FIGS. 1A-1C illustrate technical components of an exemplary distributed computing environment 100 for rectifying server failure of distributed file systems utilizing predictive logical markers, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIGS. 2A-2B illustrate an exemplary distributed ledger technology (DLT) architecture, in accordance with an embodiment of the invention. DLT may refer to the protocols and supporting infrastructure that allow computing devices (peers) in different locations to propose and validate transactions and update records in a synchronized way across a network. Accordingly, DLT is based on a decentralized model, in which these peers collaborate and build trust over the network. To this end, DLT involves the use of potentially peer-to-peer protocol for a cryptographically secured distributed ledger of transactions represented as transaction objects that are linked. As transaction objects each contain information about the transaction object previous to it, they are linked with each additional transaction object, reinforcing the ones before it. Therefore, distributed ledgers are resistant to modification of their data because once recorded, the data in any given transaction object cannot be altered retroactively without altering all subsequent transaction objects.

To permit transactions and agreements to be carried out among various peers without the need for a central authority or external enforcement mechanism, DLT uses smart contracts. Smart contracts are computer code that automatically executes all or parts of an agreement and is stored on a DLT platform. The code can either be the sole manifestation of the agreement between the parties or might complement a traditional text-based contract and execute certain provisions, such as transferring funds from Party A to Party B. The code itself is replicated across multiple nodes (peers) and, therefore, benefits from the security, permanence, and immutability that a distributed ledger offers. That replication also means that as each new transaction object is added to the distributed ledger, the code is, in effect, executed. If the parties have indicated, by initiating a transaction, that certain parameters have been met, the code will execute the step triggered by those parameters. If no such transaction has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general purpose deployment of decentralized applications. In some embodiments, a distributed ledger may be characterized as a public distributed ledger, a consortium distributed ledger, or a private distributed ledger. A public distributed ledger is a distributed ledger that anyone in the world can read, anyone in the world can send transactions to and expect to see them included if they are valid, and anyone in the world can participate in the consensus process for determining which transaction objects get added to the distributed ledger and what the current state each transaction object is. A public distributed ledger is generally considered to be fully decentralized. On the other hand, fully private distributed ledger is a distributed ledger whereby permissions are kept centralized with one entity. The permissions may be public or restricted to an arbitrary extent. And lastly, a consortium distributed ledger is a distributed ledger where the consensus process is controlled by a pre-selected set of nodes; for example, a distributed ledger may be associated with a number of member institutions (say 15), each of which operate in such a way that the at least 10 members must sign every transaction object in order for the transaction object to be valid. The right to read such a distributed ledger may be public or restricted to the participants. These distributed ledgers may be considered partially decentralized.

As shown in FIG. 2A, the exemplary DLT architecture 200 includes a distributed ledger 204 being maintained on multiple devices (nodes) 202 that are authorized to keep track of the distributed ledger 204. For example, these nodes 202 may be computing devices such as system 130 and client device(s) 140. One node 202 in the DLT architecture 200 may have a complete or partial copy of the entire distributed ledger 204 or set of transactions and/or transaction objects 204A on the distributed ledger 204. Transactions are initiated at a node and communicated to the various nodes in the DLT architecture. Any of the nodes can validate a transaction, record the transaction to its copy of the distributed ledger, and/or broadcast the transaction, its validation (in the form of a transaction object) and/or other data to other nodes.

As shown in FIG. 2B, an exemplary transaction object 204A may include a transaction header 206 and a transaction object data 208. The transaction header 206 may include a cryptographic hash of the previous transaction object 206A, a nonce 206B-a randomly generated 32-bit whole number when the transaction object is created, cryptographic hash of the current transaction object 206C wedded to the nonce 206B, and a time stamp 206D. The transaction object data 208 may include transaction information 208A being recorded. Once the transaction object 204A is generated, the transaction information 208A is considered signed and forever tied to its nonce 206B and hash 206C. Once generated, the transaction object 204A is then deployed on the distributed ledger 204. At this time, a distributed ledger address is generated for the transaction object 204A, i.e., an indication of where it is located on the distributed ledger 204 and captured for recording purposes. Once deployed, the transaction information 208A is considered recorded in the distributed ledger 204.

FIG. 3 illustrates an exemplary machine learning (ML) subsystem architecture 300, in accordance with an embodiment of the invention. The machine learning subsystem 300 may include a data acquisition engine 302, data ingestion engine 310, data pre-processing engine 316, ML model tuning engine 322, and inference engine 336.

The data acquisition engine 302 may identify various internal and/or external data sources to generate, test, and/or integrate new features for training the machine learning model 324. These internal and/or external data sources 304, 306, and 308 may be initial locations where the data originates or where physical information is first digitized. The data acquisition engine 302 may identify the location of the data and describe connection characteristics for access and retrieval of data. In some embodiments, data is transported from each data source 304, 306, or 308 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 304, 306, and 308 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 302 from these data sources 304, 306, and 308 may then be transported to the data ingestion engine 310 for further processing.

Depending on the nature of the data imported from the data acquisition engine 302, the data ingestion engine 310 may move the data to a destination for storage or further analysis. Typically, the data imported from the data acquisition engine 302 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 302, the data may be ingested in real-time, using the stream processing engine 312, in batches using the batch data warehouse 314, or a combination of both. The stream processing engine 312 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 314 collects and transfers data in batches according to scheduled intervals, trigger events, or any other logical ordering.

In machine learning, the quality of data and the useful information that can be derived therefrom directly affects the ability of the machine learning model 324 to learn. The data pre-processing engine 316 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 316 may implement feature extraction and/or selection techniques to generate training data 318. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 318 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 322 may be used to train a machine learning model 324 using the training data 318 to make predictions or decisions without explicitly being programmed to do so. The machine learning model 324 represents what was learned by the selected machine learning algorithm 320 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 322 may repeatedly execute cycles of experimentation 326, testing 328, and tuning 330 to optimize the performance of the machine learning algorithm 320 and refine the results in preparation for deployment of those results for consumption or decision making. To this end, the ML model tuning engine 322 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 318. A fully trained machine learning model 332 is one whose hyperparameters are tuned and model accuracy maximized.

The trained machine learning model 332, similar to any other software application output, can be persisted to storage, file, memory, or application, or looped back into the processing component to be reprocessed. More often, the trained machine learning model 332 is deployed into an existing production environment to make practical business decisions based on live data 334. To this end, the machine learning subsystem 300 uses the inference engine 336 to make such decisions. The type of decision-making may depend upon the type of machine learning algorithm used. For example, machine learning models trained using supervised learning algorithms may be used to structure computations in terms of categorized outputs (e.g., $C\_1$, $C\_2$ .... $C\_n$ 338) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1$, $C\_2$ .... $C\_n$ 338) live data 334 based on how similar they are to one another to solve exploratory challenges where little is known about the data, provide a description or label (e.g., $C\_1$, $C\_2$ .... $C\_n$ 338) to live data 334, such as in classification, and/or the like. These categorized outputs, groups (clusters), or labels are then presented to the user input system 130. In still other cases, machine learning models that perform regression techniques may use live data 334 to predict or forecast continuous outcomes.

It will be understood that the embodiment of the machine learning subsystem 300 illustrated in FIG. 3 is exemplary and that other embodiments may vary. As another example, in some embodiments, the machine learning subsystem 300 may include more, fewer, or different components.

FIG. 4 illustrates an exemplary failover mechanism between multiple servers, in accordance with an embodiment of the invention. FIG. 4 provides an exemplary illustration of a failover mechanism incorporated between multiple servers in alignment with an embodiment of the invention. The figure exhibits two servers, namely, Server 1 402 and Server 2 404. Server 1 houses four unique processes, associating different files with various processes. To be precise, File 1 is being processed by Process 1, File 2 is linked to Processes 2 and 3, and File 3 is attached to Process 4. Process 1 involves User A completing the processing of File 1 into a database. In Process 2, User A initiates the processing of File 2 into the database, which is currently "in progress". Similarly, in Process 3, User B begins to process File 2, leading to an output, or "O/P" 3. In Process 4, User C has File 3 lined up for processing, but the processing hasn't begun yet, and it's expected to result in output or "O/P" 4.

The crux of this failover mechanism lies in the utilization of a trained machine learning (ML) model 332 which facilitates the seamless transition of data processing tasks between Server 1 and Server 2. Server 2, like Server 1, hosts Files 1, 2, and 3. However, the processes on Server 2 involve computing logical markers for each user in their respective files. In Process 2 on Server 2, the system computes a logical marker for User A in File 2. Upon a failover event, the system resumes the processing of File 2 for User A from this computed marker and stores the progress in the database. Similarly, Process 3 on Server 2 calculates a logical marker for User B in File 2. After this computation, the system is designed to start processing from this logical marker for User B, and the result is reflected as O/P 3.

Furthermore, for any arbitrary File N on Server 2, the system considers a corresponding Process N for User N. In this case, depicted as O/P N, the system has not yet generated a marker. Thus, in the event of a failover, the system would begin to read the file from the start. The capability to generate and utilize these logical markers based on user and file association is the unique solution presented by this invention to efficiently handle failover scenarios in a distributed file processing environment.

Following the illustration in FIG. 4, the trained Machine Learning (ML) model, denoted as 332, is used to facilitate an optimized data processing system. The primary objective of this model is to predict the logical markers of file fragments dispersed across multiple nodes in the system. To achieve this, the model is based on a variety of factors such as the processing speed of each node, the file processing methods employed, and characteristics of the files themselves, among other pertinent contextual information.

The training process for this model begins with data collection. Relevant data, which could include a history of file processing events, specific node information such as processing speed, and file characteristics like size or type, are gathered. This data forms the basis for training the model. The next step, feature engineering, is where aspects of the collected data are selected for use as input to the ML model. Factors such as file size, the processing speed of each node, the username, or file processor name, and other related attributes may be chosen as features for this system. These features are designed to predict the logical marker of a file fragment accurately.

Model selection and training follow feature engineering. A suitable machine learning model is chosen, and this model is then trained using the collected data. In various embodiments, differing types of machine learning models could be suitable for this task, including decision trees, neural networks, or even more complex models like ensemble methods or deep learning models, as further described with respect to FIG. 3. The choice of the model largely depends on the specifics of the data and the problem at hand. The model is then trained using an appropriate algorithm, which adjusts the model's parameters to minimize the difference between the model's predictions and the actual outcomes.

Following the training, the model is evaluated and tuned based on its performance. This evaluation could involve using a separate set of data not used in training, allowing for a fair test of the model's predictive capabilities. If the model's performance is not satisfactory, the feature engineering or model selection steps may be revisited and adjustments made, in an iterative process aimed at optimization. Once the model has been satisfactorily trained and tuned, it is deployed in the system and used to predict the logical markers of file fragments. Given the dynamic nature of file processing, the deployed model may also adopt online learning. This means the model is not static but continues to learn and update its parameters based on new data, in real time. This approach maintains the robust performance of the model, even as the data or context evolves over time.

FIG. 5 illustrates an intelligent process utilizing logic markers 500, in accordance with an embodiment of the invention. In this illustration, the DFS (Distributed File System) client 502 has three primary connections. Firstly, it establishes a "read" connection with the trained ML (Machine Learning) model 332. This connection allows the DFS client to receive predictions from the trained ML model about the logical markers for file fragments, thereby enhancing the client's ability to manage and access files in the distributed system.

Secondly, the DFS client has an "open" connection with the DLT (Distributed Ledger Technology) architecture 200. DLT provides a decentralized environment for recording transactions across multiple nodes in the network. This connection enables the DFS client to tap into the DLT to retrieve transaction data and block locations, enhancing the system's robustness and transparency. The third connection of the DFS client is a "close" connection with the FS (File System) data input stream 504. This connection closes the loop between the data input and the DFS client, allowing for the secure and efficient transmission of data.

The trained ML model 332 and the FS data input stream 504 also connect for "send block address" purposes. This connection facilitates the ML model to communicate the predicted block addresses to the data input stream, enhancing the system's overall efficiency. The DLT architecture 200 is also operatively connected to a primary node 508, which retrieves block location information from the general ledger 506. This ledger, part of the DLT architecture, records all transactions in the network, providing a comprehensive and reliable source for block location data.

Finally, a secondary node 510, which may consist of a variety of nodes such as nodes 1, 48, 77, 92, and 100 (shown for illustrative purposes), connects to the FS data input stream 504 via a read connection. This connection enables these nodes to access and process data from the input stream, further enhancing the efficiency and distributed nature of the system.

FIG. 6 illustrates a process flow for rectifying server failure in distributed file systems by utilizing predictive logical markers, denoted as 600, in accordance with an embodiment of the disclosure. The process begins at block 602 where the DFS (Distributed File System) client provides the user's details, file name, and block address. These are the essential details required by the system to determine the state of file processing and to ascertain the point from which the system should resume processing in the event of a failure. Following that, the system, at block 604, investigates whether there's any previous read information available for the specified file and user. This involves checking if the user has previously interacted with the specified file. If such information exists, it can provide a useful context for deciding the best course of action in the event of a server failure.

In block 606, depending on the availability of the previous read information, the system takes one of two paths. If previous read information is available ('yes'), the system utilizes the trained ML (Machine Learning) model 332 to predict the logical marker, as shown in block 610. The logical marker is essentially a pointer that indicates where the system should resume processing the file from. Once the logical marker is predicted, the system sends the remaining block addresses (those yet to be processed) to the DFS client.

On the other hand, if there's no previous read information available ('no'), as shown in block 608, the system sends all block addresses for the file, as shown in block 612. This implies that the system needs to process the file from the beginning since there's no prior context available. Finally, as shown in block 614, the process concludes by completing the processing at the DFS. The DFS client then proceeds to process the file blocks, either from the predicted logical marker (if one was provided) or from the beginning of the file (if no previous read information was available). This strategy enables an efficient and effective mechanism to rectify server failures, minimizing redundant processing and ensuring a seamless user experience.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for rectifying server failure of distributed file systems utilizing predictive logical markers, the system comprising:
   a processing device;
   a non-transitory storage device containing instructions when executed by the processing device, causes the processing device to perform the steps of:
      receiving, via a distributed file system (DFS) client, user details, a file name, and a block address;
      determining, via the DFS client, that previous read information is available for the file name and the user details;
      predicting, via a trained machine learning (ML) model, logical markers for file fragments of a file based on previous read information, the user details, the file name, and the block address;
      transmitting, via the ML model, one or more remaining block addresses to the DFS client upon determining the previous read information is available;
      facilitating a data input stream, wherein the data input stream comprises a communication of a predicted block address, wherein the data input stream is operatively connected to both the DFS client and the ML model;
      retrieving, via a primary node, block location information from a distributed ledger; and
      processing the data input stream via a secondary node.

2. The system of claim 1, wherein the system is further configured to:
   determine a failover event in an absence of previous read information; and
   transmit all block addresses for the file to the DFS client, allowing for processing of the file.

3. The system of claim 1, wherein the ML model is trained to predict the logical markers of file fragments dispersed across multiple nodes, using factors including processing speed of each node, file processing methods employed, and characteristics of the file.

4. The system of claim 1, wherein the ML model is configured to adopt online learning comprising continuous learning and updating of parameters based on new data in real time or near-real time.

5. The system of claim 1, wherein the user details comprise user identity and user file processing history.

6. The system of claim 1, wherein the ML model comprises data inputs including a history of file processing events and specific node information including processing speed, file size, and file type.

7. The system of claim 1, wherein the block addresses sent to the DFS client indicate where, in the file, processing should resume in the event of a failover.

8. A computer program product for rectifying server failure of distributed file systems utilizing predictive logical markers, the computer program product comprising a non-transitory computer-readable medium comprising code causing an apparatus to:
   receive, via a distributed file system (DFS) client, user details, a file name, and a block address;
   determine, via the DFS client, that previous read information is available for the file name and the user details;
   predict, via a trained machine learning (ML) model, logical markers for file fragments of a file based on previous read information, the user details, the file name, and the block address;

transmit, via the ML model, one or more remaining block addresses to the DFS client upon determining the previous read information is available;

facilitate a data input stream, wherein the data input stream comprises a communication of a predicted block address, wherein the data input stream is operatively connected to both the DFS client and the ML model;

retrieve, via a primary node, block location information from a distributed ledger; and process the data input stream via a secondary node.

9. The computer program product of claim 8, wherein the code further causes the apparatus to:

determine a failover event in an absence of previous read information; and transmit all block addresses for the file to the DFS client, allowing for processing of the file.

10. The computer program product of claim 8, wherein the ML model is trained to predict the logical markers of file fragments dispersed across multiple nodes, using factors including processing speed of each node, file processing methods employed, and characteristics of the file.

11. The computer program product of claim 8, wherein the ML model is configured to adopt online learning comprising continuous learning and updating of parameters based on new data in real time or near-real time.

12. The computer program product of claim 8, wherein the user details comprise user identity and user file processing history.

13. The computer program product of claim 8, wherein the ML model comprises data inputs including a history of file processing events and specific node information including processing speed, file size, and file type.

14. The computer program product of claim 8, wherein the block addresses sent to the DFS client indicate where, in the file, processing should resume in the event of a failover.

15. A method for rectifying server failure of distributed file systems utilizing predictive logical markers, the method comprising:

receiving, via a distributed file system (DFS) client, user details, a file name, and a block address;

determining, via the DFS client, that previous read information is available for the file name and the user details;

predicting, via a trained machine learning (ML) model, logical markers for file fragments of a file based on previous read information, the user details, the file name, and the block address;

transmitting, via the ML model, one or more remaining block addresses to the DFS client upon determining the previous read information is available;

facilitating a data input stream, wherein the data input stream comprises a communication of a predicted block address, wherein the data input stream is operatively connected to both the DFS client and the ML model;

retrieving, via a primary node, block location information from a distributed ledger; and processing the data input stream via a secondary node.

16. The method of claim 15, wherein the method further comprises:

determining a failover event in an absence of previous read information; and transmitting all block addresses for the file to the DFS client, allowing for processing of the file.

17. The method of claim 15, wherein the ML model is trained to predict the logical markers of file fragments dispersed across multiple nodes, using factors including processing speed of each node, file processing methods employed, and characteristics of the file.

18. The method of claim 15, wherein the ML model is configured to adopt online learning comprising continuous learning and updating of parameters based on new data in real time or near-real time.

19. The method of claim 15, wherein the user details comprise user identity and user file processing history.

20. The method of claim 15, wherein the ML model comprises data inputs including a history of file processing events and specific node information including processing speed, file size, and file type.

* * * * *